(12) United States Patent
Movshovitz et al.

(10) Patent No.: US 11,533,373 B2
(45) Date of Patent: Dec. 20, 2022

(54) GLOBAL ITERATIVE CLUSTERING ALGORITHM TO MODEL ENTITIES' BEHAVIORS AND DETECT ANOMALIES

(71) Applicant: TRACKERDETECT LTD, Ramat Gan (IL)

(72) Inventors: David Movshovitz, Givatayim (IL); Adi Degani, Givatayim (IL)

(73) Assignee: TRACKERDETECT LTD., Givatayim (IL)

( * ) Notice: Subject to any disclaimer, the term of this patent is extended or adjusted under 35 U.S.C. 154(b) by 0 days.

(21) Appl. No.: 17/302,394

(22) Filed: Apr. 30, 2021

(65) Prior Publication Data

US 2022/0279045 A1    Sep. 1, 2022

Related U.S. Application Data

(60) Provisional application No. 63/200,295, filed on Feb. 26, 2021.

(51) Int. Cl.

| | | |
|---|---|---|
| *G06F 15/16* | (2006.01) | |
| *H04L 67/142* | (2022.01) | |
| *H04L 67/306* | (2022.01) | |
| *G06K 9/62* | (2022.01) | |
| *H04L 9/40* | (2022.01) | |
| *H04L 67/50* | (2022.01) | |

(52) U.S. Cl.
CPC .......... *H04L 67/142* (2013.01); *G06K 9/6284* (2013.01); *H04L 63/1416* (2013.01); *H04L 63/1425* (2013.01); *H04L 67/306* (2013.01); *H04L 67/535* (2022.05)

(58) Field of Classification Search
CPC ..... H04L 67/142; H04L 67/22; H04L 67/306; H04L 63/1416; H04L 63/1425; H04L 67/535
USPC .................................................. 709/227–228
See application file for complete search history.

(56) References Cited

U.S. PATENT DOCUMENTS

| | | | |
|---|---|---|---|
| 8,225,402 B1* | 7/2012 | Averbuch | H04L 63/14 |
| | | | 726/22 |
| 8,365,284 B2* | 1/2013 | Wahl | H04L 63/1416 |
| | | | 709/227 |
| 10,291,637 B1* | 5/2019 | Bardenstein | H04L 63/1416 |
| 2017/0068816 A1* | 3/2017 | Cavazos | G06F 21/562 |
| 2017/0070479 A1* | 3/2017 | Menezes | H04L 63/1425 |
| 2018/0248902 A1* | 8/2018 | Dănilă-Dumitrescu | |
| | | | H04L 63/1425 |
| 2020/0195683 A1* | 6/2020 | Kuppa | H04L 63/1416 |
| 2020/0267057 A1* | 8/2020 | Garvey | H04L 41/0654 |

(Continued)

*Primary Examiner* — Bharat Barot
(74) *Attorney, Agent, or Firm* — Reches Patents

(57) ABSTRACT

A method for searching for abnormal sessions, the method may include (a) obtaining session metadata for each of session of a group of sessions; wherein a session metadata of a session is indicative of at least one session feature that represents activities of the session; (b) forming multiple chunks, whereas each chunk comprises session metadata regarding a portion of the group of sessions; (c) for each chunk, generating chunk-based clusters by applying an iterative clustering process on data points that represent session metadata of the chunk; (d) generating group-based clusters, based on the chunk-based clusters; (e) determining, based at least on the group-based clusters, user profiles and abnormal sessions.

26 Claims, 5 Drawing Sheets

(56) References Cited

U.S. PATENT DOCUMENTS

2021/0398146 A1* 12/2021 Ivanov ................ H04L 63/1425

* cited by examiner

GLOBAL ITERATIVE CLUSTERING ALGORITHM TO MODEL ENTITIES' BEHAVIORS AND DETECT ANOMALIES

CROSS REFERENCE

This application claims priority from U.S. provisional patent filing date Feb. 26 2021, Ser. No. 63/200,295 which is incorporated herein by reference.

BACKGROUND

Clustering is a well-known problem in a large variety of fields and may appear under different names in different contexts, such as unsupervised learning (in pattern recognition), numerical taxonomy (in biology ecology), typology (in social sciences) and partition (in graph theory).

The purpose of cluster-analysis is the classification of objects according to similarities among them, and organizing objects into groups. A cluster is a group of objects that are more similar to each other than to objects in other clusters. There are many clustering algorithms available. The most commonly used is K-Mean which generates sub-optimal clusters. Several enhancements have been suggested to address the shortcomings of K-Mean. However, the computational complexity of these enhancements is increasing rapidly as the number of objects to be clustered increase, which limits their practical usability once the number of objects to be clustered is more than several thousands. Thus, in many cases where the number of objects to be clustered is in the scale of millions, these K-Mean enhancements become totally impractical. An example of such use-case is when the need is to cluster the entire usage of a system/application. There is therefore a definite need for a clustering algorithm that will be able to process any number of objects.

In addition, most of the clustering algorithms, require as an input the number of clusters to be generated. However, in many cases, such as when you cluster entity's activity flows (i.e. sessions of entity activities), you don't know how many groups of similar behavior exists. Thus, you can't define how many clusters to generate.

Another limitation of many clustering algorithms is that their accuracy is affected by anomalies that exist in the raw data to be clustered. Such anomalies can become clusters by themselves and degrade the accuracy of the outcome of the clustering algorithm. In most practical use cases there is no way to clean the data and remove the anomalies from the data. Thus, there is a need for a clustering algorithm (engine) which can detect and clean these anomalies are doesn't make them clusters.

One of the fields in which such an algorithm is required is to detect anomalies in order to detect cyber-attacks. In the past detecting anomalies was done using rule-based mechanisms. However, rule based detection system have not proven effective due to the need to tailor specific rules for each system/application. In addition, rules can detect only known attacks, and today most cyber-attacks are constantly changing their attack patterns. In addition, rules based detection systems tend to generate many false positive alerts, due to the fact that there is no common behavior that can be used as a baseline to detect anomalies.

Another approach taken by security products called UEBA is to use volumetric and/or frequency analysis to detect anomalies. For example, these solutions try to detect anomaly behavior by detecting abnormal number of operations performed by the entity, abnormal number of bytes sent/received by the entity, abnormal set of IPs connecting to an entity, etc. This is done by learning statistical parameters for each feature, such as the average, median and standard deviation of the number of daily operations performed by a user, and then comparing the daily number of operations performed by the user to these statistical quantities to detect anomalies. However, applying volumetric/frequency analysis on such features also generate many false anomalies, and the current UEBA solutions try to compensate for that by aggregating anomalies per entity (e.g. user) to identify risky entities. This approach is not effective when the attacker is working in parallel to the legitimate user (using for example stolen credentials), or when a malicious insiders combine normal sessions with malicious ones, or are working slowly below the radar from frequency/volumetric perspective.

SUMMARY

The summary should be used to interpret the claims.

There may be provided a method, system and non-transitory computer readable medium for searching for abnormal sessions. The method may include (a) obtaining session metadata for each of session of a group of sessions; wherein a session metadata of a session is indicative of at least one session feature that represents activities during the session; (b) forming multiple chunks, whereas each chunk comprises session metadata regarding a portion of the group of sessions; (c) for each chunk, generating chunk-based clusters by applying an iterative clustering process on data points that represent session metadata of the chunk; (d) generating group-based clusters, based on the chunk-based clusters; (e) determining, based at least on the group-based clusters, user profiles and abnormal sessions.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Figure 1:
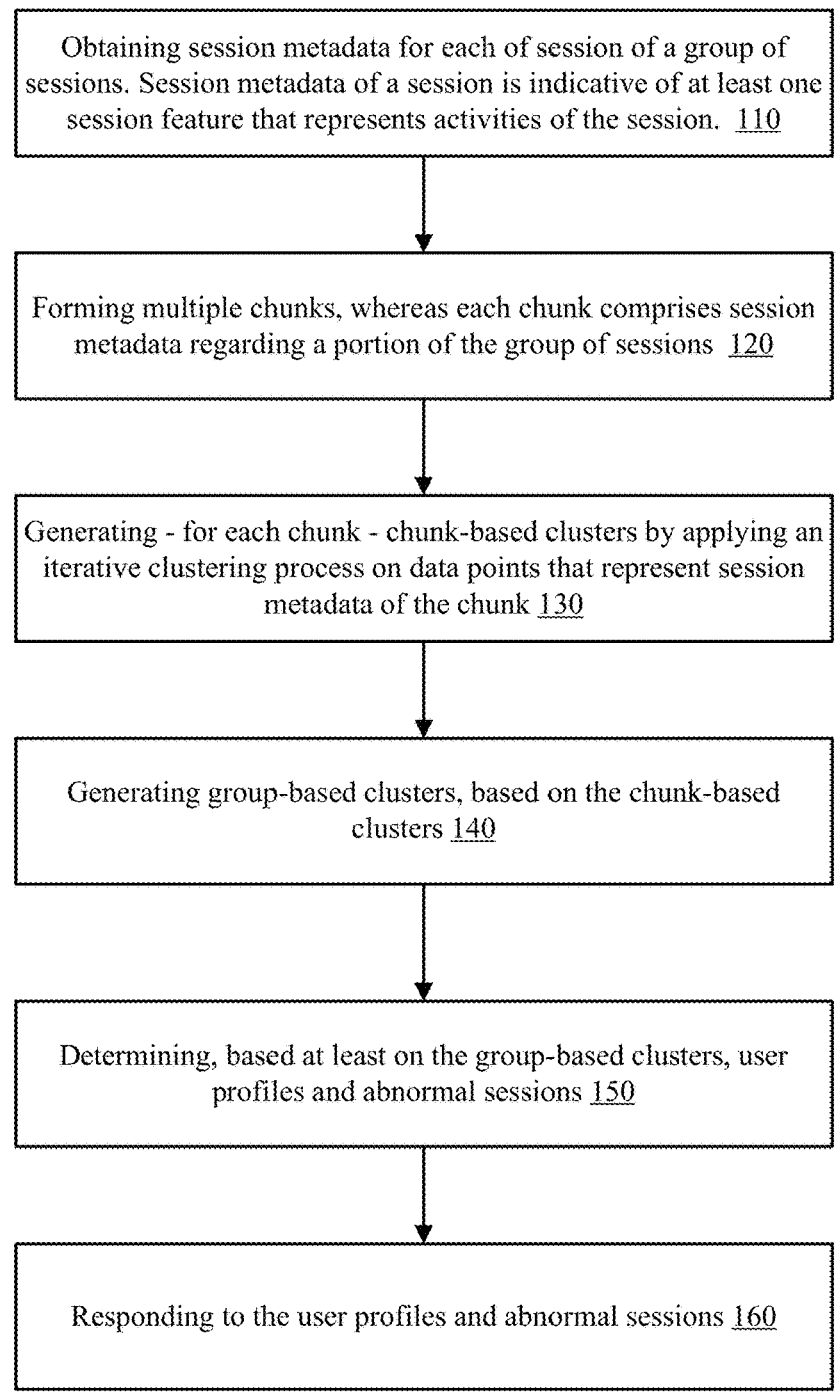
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central control unit (CPU), and/or one or more other integrated circuits such as application-specific integrated circuits (ASICs), field programmable gate sets (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a solution that may center around a clustering algorithm that can be used to cluster any number of sessions (that may be represented by multi-dimensional histograms). The method divides the sessions into chunks according to some criteria (examples for such criteria are given in the detailed description below), and then to perform the clustering on each chunk. After creating the initial set of chunk-based clusters for each chunk, the algorithm review the chunk-based clusters generated and remove from these chunk-based clusters sessions that "far" from their chunk-based cluster's centroid (i.e. sessions that are not truly belong to their clusters), as well as very small chunk-based clusters that doesn't represent true cluster (we call this step "cluster cleaning"). As a result of this "cluster cleaning" we obtain a set of sessions that have been removed from the chunk-based clusters or belong to "tiny" chunk-based clusters that have been removed due to their small size, to provide out-of-cluster data points that represent a current set of un-clustered sessions. Then apply the above process (i.e. clustering the current set of un-clusters sessions and then perform "cluster cleaning" to the newly generated clusters) on the current set of un-clustered sessions, and as result the method receives more chunk-based clusters and reduce the number of un-clustered sessions. The clustering is iterated several times (that can be determined by the number of sessions to be clustered, or by some other criteria). At the end of these iterations the method provides a set of chunk-based clusters that can be processed to provide group-base clusters. The generation of the group-based clusters can include looking for similar chunk-based clusters and combine them into a group-based cluster (the combine phase), and perform "cluster cleaning" on the updated set of group-based clusters generated by the combine phase. The result is a set of group-based clusters that may provide close to optimum clustering solution to the group of sessions.

The clustering algorithm may be used for various purposes—for example for detecting cyber-attacks and malicious insiders using log records that describe the activities performed by entities in a system/application. To be able to detect anomalies using different types of log records as well as different types of system/application, the method may use a generic activity model that can be applied to any log records from any system/application.

Given the log records read from a log repository, the method may generate a group of sessions, were each session represents a sequence of entity's activities in the system/application. For each session, the system generates a set of histograms that represent the main features/properties of the session, such as:
  a. Activities perform by the entity/user during the session.
  b. Entity's/User's navigation between activities during the session
  c. Time difference between activities during the session.

This set of features uniquely characterizes an entity's session since it profiles not only what the entity did, but also the order it performed these activities (i.e. its navigation pattern), and the time/navigation pattern. (Note: if we cluster the sessions of all the entities to learn about the global behavior patterns/profiles, the method may not use the time differences between activities, since they may be too specific to each entity.)

The method may cluster the sessions either per entity or it may cluster the entire set of sessions (depending on the detection goal)

For each of the group-based clusters, the method may generate a profile (that may be represented as histograms). Each group-based cluster's profile is generated from the histograms of the sessions that have been associated with the group-based cluster.

Then, the method may compute for each session a similarity score that measures the similarity between the session's histograms and session's group-based cluster's histograms (i.e. the histograms of the group-based cluster the session was associated with by the clustering algorithm). The session's similarity score is translated into a probability that describe the session resemble to the typical behavior profile represented by the group-based cluster.

If the similarity probability for a session is below a threshold, i.e. an anomaly is detected, the system try to find the most similar group-based cluster for this session, in order to obtain the best similarity score for that session.

If the best similarity probability is below the a pre-defined threshold the system can send a detailed alert to the organization's CSIRT for investigation and remediation.

There is provided a method for clustering sessions (sequence of entity's activities described by a set of multi-dimensional histograms) and the usage of this clustering to model normal usage behavior patterns (e.g. user behavior, business processes, application flow controls, etc.) and to detect abnormal sessions (that can be an indication to cyber-attack or to malicious activity).

Particularly, this solution relates to the ability to cluster large number of sessions into group-based clusters, where each group-based cluster contains sessions with similar properties. Specifically, method may perform chunk-based clustering on chunks of sessions (each chunk may contain hundreds or thousands of sessions), and then to combine the chunk-based clusters generated for each chunk into a group-based clusters that provide close approximation to the global optimum clustering solution to the original set of sessions.

Since the clustering is performed on one histogram per session that may not describe all the session features, the solution then may verify the result of the clustering algorithm using the other session's features, in order to remove from each group-based cluster sessions that are not similar to the set of sessions represented by the group-based cluster in all the session's features, such that at the end of the process, each group-based cluster contain only sessions that resemble to each other in all (or most) of the session's features.

The group-based clusters generated by the clustering algorithm enable to model typical behavior profiles in the analyzed system/application given a set of log activities. These behavior profiles are important in the field of Process Mining and Automated Application Process Discovery (ABPD) that are part of Business Process Management. These behavior profiles are used to analyze the users' usage patterns in order to improve the user experience or to make the process more efficient. In addition, the clustering algorithm can be used to model the actual application flow control, used to analyze application usage patterns and application performance.

The solution, is also applicable for detecting abnormal sessions within a group of entity's sessions (that describes the entity usage of an application/system). Detecting such abnormal sessions is important in the field of cyber security to detect cyber-attacks such as impersonation (e.g. account take over), malicious insiders (i.e. employees performing malicious activities), lateral movement of a malware within the organization network, etc.

The solution, is also applicable for detecting abnormal sessions within the entire group of sessions, i.e. clustering the sessions of a multiple entities using the system/application in order to find sessions that deviate from the normal behaviors patterns/profiles. Detection such abnormal sessions can be important to detect improper usage of the system/application either due to malicious intention by an adversary, or due to missing of knowledge by a user/employee.

To significantly increase the accuracy of anomaly detection, detection should be based on features that truly differentiate between users. Thus, the suggested solution detects abnormal entity's sessions based on the entity's activity-flow during a session (i.e. a set of consecutive activities performed by the entity), i.e. the activities performed by the entity during the session, the order in which these activities are performed during the session, and the time difference between activities during the session.

Since a session is a set of consecutive activities performed by the entity, the solution can apply to any scenario where the solution can access log-records which describe the activities performed by each entity in a system/application.

In order to accurately model the entity's behavior and/or to detect anomalies (especially anomaly sessions)—the method should not be based on "learning" only one typical behavior pattern/profile per entity, since in real-life an entity may have more than one typical behavior. For example:

a. A husband and a wife are sharing a bank account, and they both can login into the e/m-banking application and perform activities using their e/m-banking application. It is logical to assume that each one of them has its own typical behavior(s) when using the e/m-banking application. If the method wants to detect impersonation by detecting a session that deviate from the normal "user" behavior profile during the e/m-banking session, the method needs at least to differentiate between the husband sessions and the wife sessions and generate a behavior profile for each of them, and then check each new session against both behavior profiles, and only if it deviates from profiles the method can mark the session as suspicious. (If the method would try to create a one behavior profile for the sessions of the husband and the wife it will be very inaccurate, and even their normal sessions may deviate from this profile). In reality both the husband and his wife will have at least few behavior profiles each.

b. Several company executives have access to the company bank account and can perform operations in the company's bank account. Each of the partners has its own role in the company and as a result each of them as a different typical behavior during his/her e/m-banking sessions. If the method wants to detect impersonation by detecting a session that deviate from the normal "user" behavior profile during the e/m-banking session, the method needs to differentiate between the executives' sessions and generate at least one behavior profile for each of them, and then check each new session against the set of executives' behavior profiles, and only if it deviates from all these profiles the method can mark the session as suspicious. In reality each of the executives will have multiple behavior profiles.

c. If the method should detect a suspicious/malicious employee activity within the company application (e.g. an ERP application or a corporate portal) the method needs to create for each employee a set of behavior profiles (per application), since the same employee can use the corporate application is various ways when performing different tasks.

All the above examples are taken from the cyber security space and relates to what is known today as cyber User/Entity Behavior Analytics (UEBA) or Security User Analytics (SUA). However, user analytics is applicable in many other scenarios, such as:

a. Learn how users are using an application in order to analyze if and how the solution can enhance the user experience in the application. Of course each user has its own usage patterns, but it is logical to assume that the method can categorize the users' behavior during an application's session to a set of typical behaviors, which will enable to analyze each typical behavior. In addition, the method can analyze the sessions that deviate from the typical profiles to understand why the user has chosen to work this abnormal way.

b. Model organizational business processes, due to lack of documentation or due to changes that has happened during time. A common scenario is that the organization has log-records that describe the activities done by the employees/users during their sessions, and the organization would like to translate these events into models of business processes.

In all the above scenarios the method has a set of log-records (from a logging repository) that describe user/entity activities in the system/application, and the goal is to generate a set of behavior profiles/models that accurately represent the user/users sessions.

The challenge is that even after the method constructs the users' sessions from the raw log-records the method don't have any indication to which business process the session belongs or in general to which (unknown) typical behavior the session belongs (referred to as a non-supervised mode in machine learning). Thus the method needs to apply clustering techniques to divide the sessions into group-based clusters of similar behavior, and then the method can generate a model/profile for each set of sessions.

To summarize, to be able to build behavior profiles from a given set of sessions the method needs to cluster the sessions into group-based clusters and then the method can generate a behavior profile for each set of sessions (belonging to a single group-based cluster) to reflect the "user/entity" behavior during this type of sessions. The method can then use these set of behavior patterns/profiles for various purposes, including detecting anomaly sessions, i.e. sessions that deviate from the normal behavior profiles learned for the entity.

FIG. 1 illustrates method 100 for searching for abnormal sessions.

Method 100 may start by step 110 of obtaining session metadata for each session of a group of sessions. Session metadata of a session is indicative of at least one session feature that represents activities of the session.

There may be multiple session features—and step 110 may be executed based on one, some or all features. Representing a session by only one or some of the features may significantly reduce the computational and/or memory resources required for executing at least some of the steps of method 100.

The group of sessions may include a vast number of sessions—for example one hundred thousand, one million, and even more.

The sessions of the group may belong to a single user or to multiple users.

Step 110 may be followed by step 120 of forming multiple chunks, whereas each chunk comprises session metadata regarding a portion of the group of sessions.

The different portions of the group of sessions may include the same number of sessions. Alternatively—one portion of the group of sessions may include more sessions that another portion of the group of sessions.

The number of portions and accordingly the number of sessions per chunk may be selected in any manner. For example—the number of portions may be substantially equal to the number of sessions per chunk. Yet for another example—the number of portions may significantly differ from the number of sessions per chunk.

The number of sessions per chunk may be selected based on the resources required to execute step 130—per chunk.

The session metadata of a session may include an ordered sequence of identifiers of the activities of the session, the ordered sequence is ordered according to an occurrence of each activity within the session. Under this assumption—step 120 may include (a) generating a sorted list of sessions metadata, the sorted list is sorted according to the ordered sequences of identifiers of the sessions, and (b) segmenting the sorted list of sessions into chunks Step 120 may be followed by step 130 of generating—for each chunk—chunk-based clusters by applying an iterative clustering process on data points that represent session metadata of the sessions within the chunk.

Chunk-based clusters are clusters that are generated based on the data points that represent session metadata sessions within the chunk.

Examples of the iterative clustering process are illustrated below.

The execution of the chunk-based clusters is done based on the sessions metadata of the sessions with the chuck—and not on the entire sessions metadata of the sessions of the group—thus is much more efficient—especially when using an iterative clustering process having a complexity that exceeds and even well exceeds the number of data points. For example—an enhanced K-means algorithm has a complexity that is of an order of a square of the number of data points.

The applying of the iterative clustering process is executed without a preliminary step of removing suspected outliers.

The iterative clustering process accuracy may be indifferent to an existence of outliers.

The iterative clustering process may be executed until convergence. The convergence may be defined in various manners—for example by viewing the difference between the outcome of consecutive iterations—and stopping when the difference is below a threshold.

The applying an iterative clustering process may include performing multiple clustering iterations, each clustering iteration may include applying an enhanced K-means clustering.

The first clustering iteration may include (i) selecting a first centroid based on normalized distances between a data points of a chunk, and (ii) applying the K-means clustering on the data points of the chunk, given the first centroid.

Each clustering iteration of the multiple clustering iterations (following the first clustering iteration) may include (i) selecting a new centroid, based on (a) a normalized distance of data points from other data points, and (b) distances of the data points from current centroids, and (ii) applying the k-means clustering on the data points of the chunk, given the new centroid and the current centroids.

Step 130 may be followed by step 140 of generating group-based clusters, based on the chunk-based clusters.

The generating of the group-based clusters is executed without predefining a final number of group-based clusters.

Group-based clusters are clusters that are generated based on data points that represent session metadata of the group of sessions.

Step 140 may include another iterative clustering process.

Step 140 may include merging one or more chunk-based clusters. This may be done by any clustering algorithm.

Step 140 may also include clustering out-of-cluster data points.

The out-of-cluster data points may be an outcome of step 130.

When applying the group iterative clustering process—each iteration tries to cluster out-of-cluster points of the previous iteration.

Step 130 and/or step 140 may include enforcing a minimal size of cluster. Thus—a cluster that is smaller than the minimal size is regarded as a set of out-of-cluster points.

Step 130 and/or step 140 can be repeated multiple times. One repetition may be applied on the outcome of a previous repetition. For example—a current repetition may attempt to find clusters for out-of-cluster points of the previous repetition.

Step 140 may be followed by step 150 of determining, based at least on the group-based clusters, user profiles and abnormal sessions.

The user profiles are represented by group-based clusters. The abnormal sessions are represented by out-of-cluster point.

Step 150 may be based on at least one other session feature.

For example—the session metadata obtained during step 110 may identify the activities of the session. Then at least one other session feature utilized during step 150 may include one out of activities order and timing of activities.

For example—the session metadata may be a 1-gram histogram describing the distribution of the different activities during the session. The at least one other session feature utilized during step 150 may include at least one of (a) a 2-gram histogram describing the distribution of transitions between activities during the session, and (b) a time difference histogram describing the distribution of time difference between activities during the session.

Any other representations of any of the session features may be provided.

Step 150 may be followed by step 160 responding to the user profiles and abnormal sessions.

The responding may include generating an alert, enforcing a security rule, evaluating a risk associated with an abnormal session, visualizing or otherwise providing information about the abnormal sessions and/or user profile and/or activity model, and the like.

The evaluating of the risk may be based, at least in part, on (a) a deviation of the abnormal session from a user profile, and/or on (b) a sensitivity related to one or more activities of the abnormal session.

Method 100 may include any other step illustrated in the application—for example collecting the raw group of session information, generating models, scoring sessions, and the like.

Figure 2:
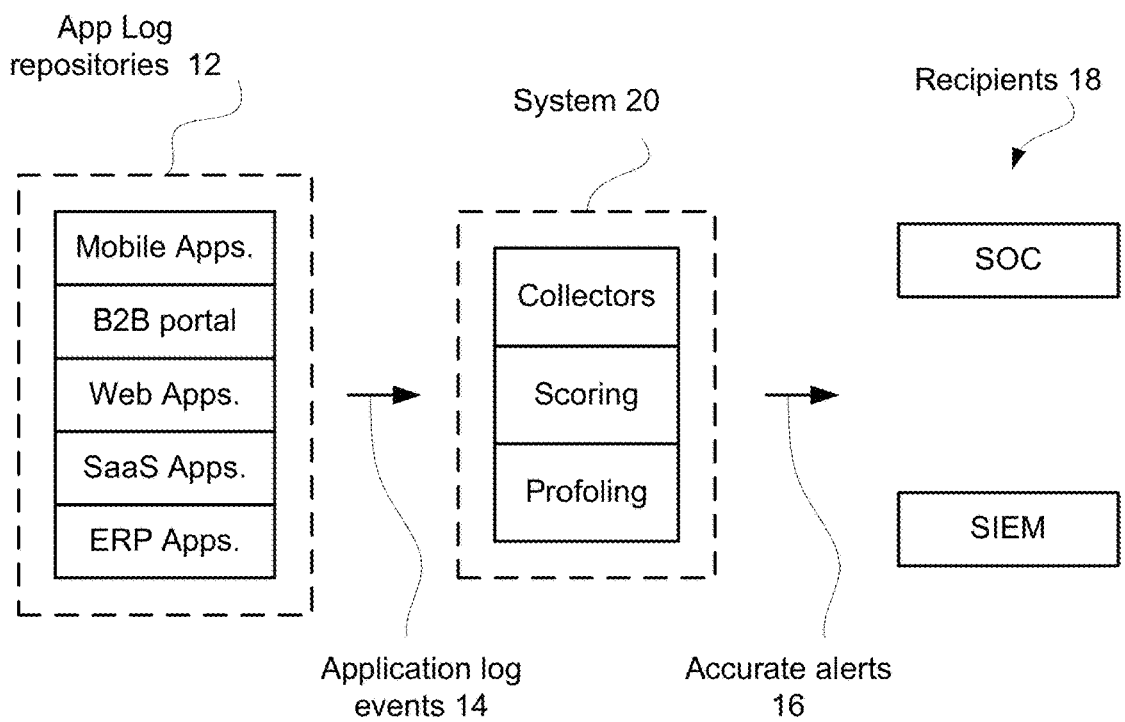
FIG. 2 illustrates an integration of a system into an enterprise/organization environment.

FIG. 2 illustrates the integration of system 20 (illustrated as including collectors, scoring units and profiling units) into an enterprise/organization environment, the interactions of system with the organization log repositories 12 to extract log records (application log events 14) as well as with recipients 18 such as organization STEM (which is typically part of the organization SOC) to which alerts (accurate alerts 16) on anomaly sessions are sent.

Figure 3:
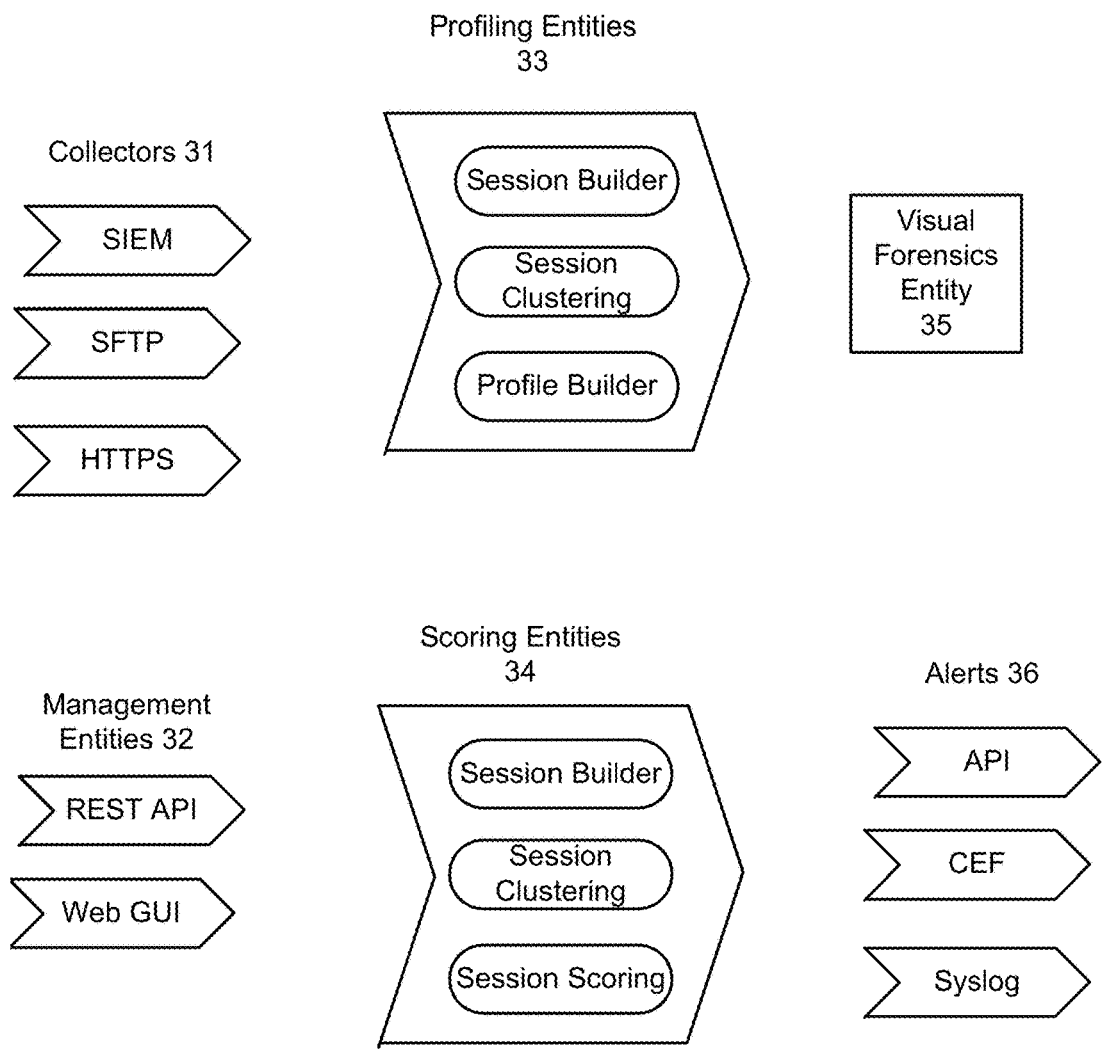
FIG. 3 illustrates an example of a high-level control flow of the system from collecting the raw log records till alerts are sent out.

FIG. 3 illustrates the high-level control flow of the system from collecting (using collectors 31) the raw log records till alerts 36 are sent out. The details of each step are described in the corresponding sub sections below. FIG. 3 illustrates management 32 entities, scoring entities 34, profiling entities 33 and visual forensic entity 35.

The sections below illustrate the system ability to incept log records via various communication channels and protocols as described in the section "Log Collector", the system ability to send alerts via various communication channels and protocols as described in the section "Alerting Component", management channels (GUI and REST APIs), and the GUI provided to a security analyst. In addition, it illustrates the three basic steps of "Profiling" sub-system which generate the activity profiles, and the three basic steps of "Scoring" sub-system which score the session according to their resemblance to the profiles generated by the "Profiling" sub-system. The components of the "Profiling" sub-system are describes the sections "Session Builder", "Clustering Engine", "Update histograms" and "Computing the average and standard deviation for each cluster". The components of the "Scoring" sub-system are described "Sessions Scoring".

Figure 4:
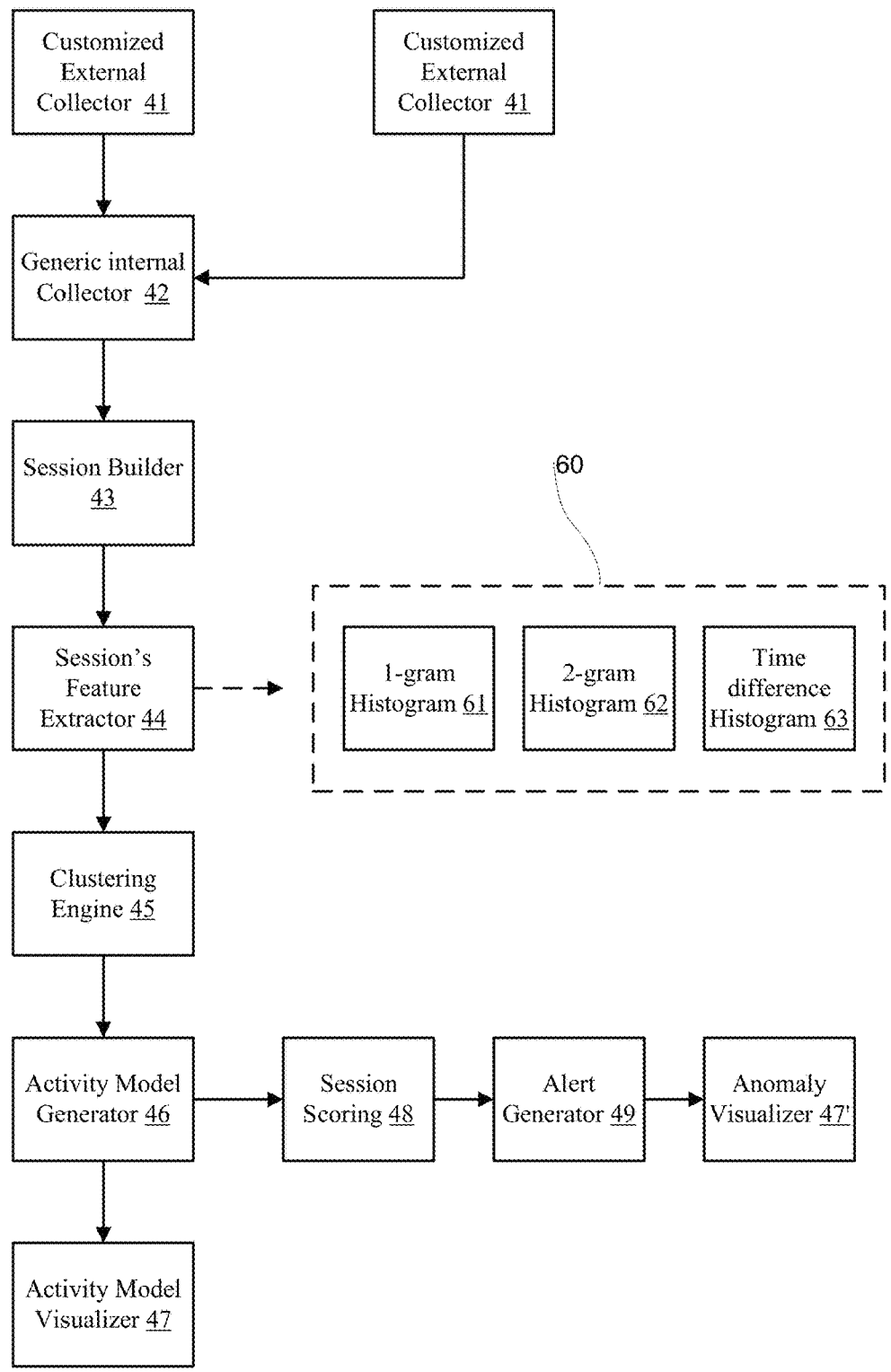
FIG. 4 illustrates an example of system high level design and components, and the data flow between the system components.

FIG. 4 illustrates the system 20 high level design and components, and describe the data flow between the system components such as customized external collectors 41, generic internal collector 42, session builder 43, Sessions, feature extractor 44 (that may extract 1-gram histograms 61, 2-gram histograms 62, and time different histograms 63), clustering engine 45, activity model generator 46, activity model visualizer 47, session scoring 48, alert generator 49 and anomaly visualizer 47'.

The details of each component is described in the relevant section in the system description.

Clustering

The purpose of cluster-analysis is the classification of objects (represented as data points) according to similarities among them, and organizing similar objects (i.e. data points) into groups. A cluster is a group of objects (i.e. data points) that are more similar to each other than to objects (i.e. data points) in other clusters. There are chunk-based clusters and group-based clusters.

A popular and efficient clustering algorithm is the K-Mean algorithm in which the computational complexity is proportional to the number of data points (in our case sessions) multiply by the number of clusters to be generated multiply by the data point dimensionality.

However, K-Mean has several limitations and disadvantages:
  a. K-Mean is known to generate a non-optical clusters (i.e. finding a local optimum for the score function and not a global optimum)
  b. You have to provide the number of clusters to be generated as a parameter to the K-Mean algorithm and there are case where this number is unknown.
  c. It is highly recommend removing the outliers from the set of data points to be clustered as they can significantly degrade the accuracy of the clusters generated by the K-Mean algorithm, and there are cases that such operation is impossible (or at least impractical).

Several enhancements have been suggested to address the shortcomings of K-Mean. However, the computational complexity of these enhancements is increasing rapidly as the number of data points to be clustered increase, as they typically requires preparations that their computational complexity is proportional to (the number of data points)$^2$. This limits their practical usability once the number of data points to be clustered is more than several thousands.

Thus, in use cases where the number of data-points to be clustered is in the scale of millions, these K-Mean enhancements (also referred to as enhanced K-mean clustering algorithms) are totally impractical.

Examples of such use-cases are: modeling business processes, modeling system/application usage patterns and detecting abnormal sessions that deviate from the typical usage patterns. In these use cases you typically need to cluster millions of data-points or more, and as a result the current enhancements to the K-mean algorithm are impractical and there is a definite need for a new clustering algorithm that can cluster any number of data-points and provides close to global optimal solution.

The clustering algorithm described below is designed to cluster any number of data-points (e.g. sessions), and can use as a building block any clustering algorithm that provide high accuracy results in reasonable time, when clustering millions of data points (or more).

The main features of this suggested clustering solution are:
  a. No need to define the number of clusters to be generated by the clustering algorithm.
  b. Can cluster any number of data-points.
  c. Can cluster streams of objects.
  d. Clusters are updated as more data-points become available.
  e. Automatically detect outliners, i.e. anomalies.
  f. Support various similarity metrics.
  g. Support various normalization techniques.
  Histograms (features) used for clustering sessions.

As explained below the method may represent each feature of a session as a histogram. The clustering algorithm can cluster the sessions according to any histogram describing the session (or combination of histograms). i.e. any histogram can be translated into a data-point. Our current implementation (i.e. the system), clusters the sessions using the session's 1-gram histogram explained below which represents the distribution of the activities performed during the session.

Distance Metric and Normalization Techniques

A clustering algorithm require a distance metric used to compute the distances between the data points (i.e. the sessions histograms), and a normalization techniques to translate the sessions' histograms into data-points.

The current implementation of the clustering algorithm supports the following distance metrics: Cosine similarity, Euclidean, Manhattan, Min-Max, and can be extended to support other distance metrics. The default distance metric is cosine similarity.

For normalization techniques, the current implementation supports TF, IDF, TF/IDF and Min-Max normalization, and can be extended to support other normalization techniques. The default normalization technique is the Term Frequency normalization adjusted for histogram length: $f_{t,d}\div$(number of elements in histogram) combined with normalizing the sessions histograms such that their Euclidian size is 1 (i.e., translating each normalized histogram to a radius vector on a n-dimensional sphere of size 1).

(Note: for each metric there is a set of possible normalization techniques, and the distance metric and the normalization technique should be selected according to the type of session's histogram used for clustering. In addition, as mentioned above our clustering algorithm can work with various distances metrics and various normalization techniques.)

Global Iterative Clustering Algorithm (for Clustering Sessions)

The global iterative clustering algorithm performs the following steps several times, according to the number of data-points to be clustered, and if the number of data points is smaller than the size of the chunk (see below) only one iteration is performed. (Note: the maximal number of iterations is a parameter in the system configuration.)

Step 1: Generate an initial set of clusters for the un-clustered data-points.
  a. Sort the un-clustered data points according to a criteria that should organize the data points according to some basic similarity. The system sorts the data points as follows: it generates for each un-clustered data-point a string that concatenate the data-point histogram's entities according to their popularity in the data-point, and then it sorts the data points according to this string.
  b. Normalize the un-clustered data-points according to the normalization technique defined in the system configuration.
  c. Divide the sorted un-clustered data-points into chunks (that may be of a fixed length), and perform the basic clustering building block (defined below) on each chunk of un-clustered data-points. (Note: the current chunk size in the system may be set to 500, but it can be any number between 500 to 2000—or even any higher number). The maximal number of clusters to be generated when applying the basic clustering building block on a chunk (K-MAX) is determined according to the size of the chunk, such that for a 500 data points K-MAX is 13.
  d. Cluster a chunk of data points according to the following steps (which are defined as the basic clustering building block)—to provide chunk-based clusters.
    i. Compute d(i,j) the distance between each pair of data points according to the distance metric defined in the system configuration.
    ii. Compute the normalized distance for each data point v(i), as follows:

$$v_i = \sum_{j=1}^{n} \frac{d_{ij}}{\sum_{l=1}^{n} d_{jl}}, i = 1 \ldots n$$

iii. Choose the data point with the minimal v(i) as the first centroid.
    iv. Perform a standard K-mean on the set of data points given the initial centroid selected in iii and k=1. The result is the first centroid (for k=1)
    v. Given the current set of centroid the method computes for each point the quantity f(i) which is equal to its normalized distance from the other data points divided by its distance from the current set of centroids. The f(i) combine the distance of the data-point from the other data-points with the distance of the data-point from the current set of centroids.

$$f_i = \frac{v_i}{\sum_{j=1}^{k-1} d(x_i, m_j^{k-1})}, i = 1 \ldots n$$

vi. In order to select as the next centroid a data point that is as far as possible from the current centroids but is close to many data points, the data-point with the minimal f(i) is selected, and added to the set of centroids. i=argmin(f$_i$), i=1 . . . n (In addition, the number of clusters to be generated by K-mean (K) by is increased by 1.)
    vii. Perform a standard K-mean on the current chunk of data points given the current set of centroids and the number of clusters K.
    viii. Review the chunk-based clusters generated in the previous step (vii) and if a chunk-based cluster size (i.e. the number of data points associated with the cluster) is below a threshold of 3 (can be set as a parameter) the chunk-based cluster is removed and the data points associated with the chunk-based cluster are removed from the chunk (i.e. will not be clustered)
    ix. If the K (the current number of clusters generated for the current chunk) is less than K-MAX then go to step v in order to increase the number of chunk-based clusters generated for the current chunk, otherwise finish the clustering of the current chunk.

1. Note: in addition to the above condition, if during the last x tries to generate a new chunk-based cluster, the method did not succeed to increase the number of chunk-based clusters K then the clustering for the current chunk is finished.

"Remove far data-points" from chunk-based clusters generated in step 1 for each chunk:
   a. After the clustering of a chunk is finished, the chunk-based clusters generated for the chunk are reviewed, and data-points that have been assigned to a chunk-based cluster by the but their distance from the chunk-based cluster's centroid is above a threshold (defined in the system configuration) are removed from the chunk-based cluster and mark as un-clustered. (Note: The distance of a data-point from the cluster's centroid is measured according to the distance metric used by the clustering algorithm.)
   b. For each chunk-based cluster generated in step 1 the method computes the average and standard deviation of the distance of the chunk-based cluster's data-points from the chunk-based cluster's centroid. Using these average and standard deviation a normalized distance (in standard deviations) between a data point and the chunk-based cluster's centroid is computed for each data point associated with the cluster, and if this normalized distance is greater than a pre-configured threshold the data-point is removed from the chunk-based cluster and marked as un-cluster.

Note: distanceInStd=(distance−averageDistance)/StdDistance

Remove small chunk-based clusters: For each chunk-based cluster if the cluster size is below 2% of the chunk size, the chunk-based cluster is removed and all the data-points that have been associated to that cluster are marked as un-clustered.

Step 2 converts chunk-based chunks and out-of-cluster data points to group-based clusters and out-of-cluster data points.

Step 2: Combine Similar Clusters.

The result of applying step 1 to all the un-clustered data-points is a set of chunk-based clusters (each generated for a given chunk). Since there may be similar chunk-based clusters, the chunk-based clusters are compared to each other to identify similar chunk-based clusters (i.e. clusters that the distance between their centroids is below a threshold (defined in the system configuration)). If similar chunk-based clusters are found, they are combined into a single group-based cluster. The result of this step is a set of group-based clusters (i.e. clusters of data-points that characterize the entire-set of the initial data-points)

Step 3: Clean "far data-points" from Clusters

During In the "Combine Similar Clusters" step, when similar chunk-based clusters are combined their data-points are added to generate a new combined group-based cluster. As a result, some of the data points in the new combined group-based cluster may become "far data-points", i.e. "far" from the new group-based cluster's centroid (as defined in the "Remove far data-points" section in step 1 above). Thus, the "Remove far data-points" operation (as defined above in section "Remove far data-points" of step 1) if performed on the new group-based clusters generated as a result of the "Combine Similar Clusters" step.

Step 4: Associate un-clustered data-points with Existing Clusters

There may be data-points that are similar to one of the clusters generated, but due to the fact that the clustering algorithm has previously been performed in chunks, these data points have not been associated to that cluster. To assign such data-points to a group-based cluster similar to them, a loop on the uclustered data points is performed, and for each such data-point the closest group-based cluster is found. If the distance between a data point and its closest centroid is below the thresholds (used to remove far data-points), the data-point is associated with its closest group-based cluster.

Step 5: Clean Small Clusters

Small group-based clusters below a certain size (define in the system configuration) should not be considered as clusters, as they may be a set of anomaly data points. Thus, such small group-based clusters (if exist) are removed from the set of group-based clusters, and the data points associated with them are marked as un-clustered.

It should be noted that after each iteration of the 5 steps we reduced the number of un-clustered data points, and the data-points that remained as un-clustered data-points after the last iteration are defined as anomalies System There may be provided a system that may include at least some of the following components (see, for example FIG. 4):
   a. Events collector—denoted 41 and 42.
   b. Session builder 43.
   c. Session's feature extractor 44 for building/updating clusters histograms.
   d. Clustering engine 45 for building/updating clusters (using the global iterative clustering algorithm described above) and for searching for the best cluster for sessions that are currently defined as un-clustered.
   e. Activity model generator 46 for generating/updating the features (e.g. histograms) for the group-based clusters and computing statistical properties for each cluster's feature (e.g. histogram).
   f. Session scoring 48 for scoring the sessions and compute anomaly score and anomaly sessions.
   g. Alert generator 49 for generating alerts for risky (anomaly) sessions.
   h. GUI for management and session forensics—see for example visualizers 47 and 47'.

The following sections explains various system components.

Collectors 41 and 42

The system can process any structured log records. the system log records collection is divided into an internal component and an external component. The distinction between the two components is that the external collector is designed to be adapted according to the actual type of log records and their physical source, while the internal component is completely generic. This separation enables to tailor dedicated collector per each type of log source, without any changes to the internal component which is part of the core system.

When a new use case is defined, as part of the use case configuration phase, the use-case admin should configure the external collector according to the log source characteristics. As part of this configuration the use-case admin should define:
   a. The mechanism to be used to read (i.e. retrieve) the log records.
   b. How to translate the log records into csv records (if necessary)
   c. The transformation that should be applied to certain fields in the csv record (if necessary)
   d. The mapping of the fields in the csv record into the system internal data model.

The system internal data model may include at least some of the following data elements:
a. Time.
b. User-ID (any-string that represent the User).
c. Activity (any string that represent the activity performed by the user).
d. Device (any string that represent the device used by the user to perform the activity).
e. Annotation (any string that represent additional information about the activity).

Thus, the log records collection process is composed from two processes:
a. The external collector, which reads the log records from the external repository (for example in case it is a SaaS application, this is done via the API exposed by the SaaS vendor), and transforms each log record into the system's internal data model. The set of transformations applied to a log record depends on the structure and the content of the log record. The last transformation applied is to extract the required fields and to arrange them as a formatted record to be sent to the internal collector. The result of this process is a csv file in the system's internal data model and format.
b. The internal collector, which read the csv file prepared by the external collector, and stores the formatted records in a dedicated table in the system database.

Session Builder 43

The goals of this component are to:
a. Generate sessions from the formatted log records (stored in the system database).
b. Clean each session from irrelevant events.
c. Compute a set of histograms for each session (that represent the session's features).
  i. A histogram is a set of (key, value) pairs that represent a certain feature of the session (see below more details)

Step 1: Generate sessions from the formatted log records.
The Session Builder builds the sessions as follows:
First it generates a list of users from the log records stored in the system's database. (Note: the term "user" describes the entity which performed the activities, and can be a human user, a computer, a process, etc.)
Based on the list of users created, it performs the following operations for each user:
a. Extract the list of devices used by the user (since activities generated using different devices belong to different sessions)
b. Loop on the devices used by the user.
c. Per device, sort the log records according to their time in ascending order. The result is a set the log records that represent activities performed the user using a specific device sorted according to their time.
d. Scan the sorted log records and if the time gap between consecutive activities is larger than a configured time-gap parameter then defines the event just before the time-gap as the last event of the previous session, and the event after the time-gap as the first event of a new session.

The result of this step is a set of user's sessions, where each session is a sequence of activities performed by the user using a specific device, such that the time gap between activities is less than the configured time-gap.
Note: If reduction parameter is set to N>1, then the system first apply 1 reduction, then 2 reduction, then 3 reduction till it applies N reduction.

Step 2: Remove Irrelevant Events From Session

A session may contain activities which are irrelevant to the user's behavior analysis, and these activities should be removed from the session before it is processed (i.e. its histograms are generated).
Note: The histograms builder component within the session builder can be extended to create any n-gram histogram, as well as histograms for other session's features.

The current process of cleaning a session from irrelevant activities is composed from two phases:
a. Removes activities that don't describe user's activities.
  Some log records are not describing "true" user activities and thus should be removed from the session's sequence of activities. The list of irrelevant activities to be removed for a specific use-case is defined by the use-case admin as part of the use-case configuration. (Note: the default is an empty list, i.e. no irrelevant activities.)
b. Consolidate repetitive sequences of activities:
  The motivation to consolidate repetitive sequences of activities is that in certain use cases if the user repeat an activity (or sequence of activities) several times it should be considered as one activity (or as one sequence of activities). The use case admin can define the length of repetitions to be removed, using the parameter called "reduction parameter".
  The session builder scan the session's activities and if it detects a repetitive sequences of activities, these repetitions will be consolidated according the "reduction parameter" defined by the use-case admin.
  If the reduction parameter is set to 0 then there is no reduction
  If the reduction parameter is set to 1 then it replaces consecutive activities with one activity (e.g. a set of A A A A A is replaced by A)
  If the reduction parameter is set to 2 then it replaces consecutive pairs of activities by one pair of activities (e.g. a set of A B A B A B A B is replaced by A B)
  If the reduction parameter is set to 3 then it replaces consecutive triplets of activities by one triplet of activities (e.g. a set of A B C A B C A B C A B C is replaced by A B C), . . . etc.

Step 3: Session's Histograms Builder—Generating session histograms. see—session's feature extractor 44

After the Session Builder has performed the cleaning defined in step 2, then it generates a set of histograms for each session. Each session's histogram describes a session's feature. By default the sessions builder is generating the following histograms per session:
a. A 1-gram histogram describing the distribution of the different activities during the session.
b. A 2-gram histogram describing the distribution of transitions between activities during the session.
c. A time difference histogram describing the distribution of time difference between activities during the session.

Clustering Engine 45

The clustering engine may generate group-based clusters. For simplicity of explanation the group-based clusters are referred to as "clusters".

The clustering engine receives a set of sessions' histograms generated by the Session's Histogram Builder component as its input. The clustering engine can work in two modes of operations named internally as "multi-user" and "single user".

a. In "multi-user" mode the clustering engine performs the clustering on the un-clustered sessions of each user separately (used to detect anomalies for each user individually).
b. In "single-user" mode the clustering engine performs the clustering on all the un-clustered sessions of all the users together (used to detect anomalies within a group of users).

Selecting a mode of operation is done as part of the use case configuration.

In both modes the system is using the global iterative clustering algorithm described above. In the current implementation, the data points provided as input to the clustering engine are the sessions' 1-gram histograms. As a result, a cluster's centroid is representing the typical 1-gram histogram for the sessions associated to the cluster.

The system clustering can operate in both single batch mode and in multi-batch mode. In single batch mode the system digests all the log records, generates the sessions, and perform the clustering on the entire set of sessions generated from the entire set of log records.

However, in many scenarios the log records arrive in batches. For example, if the system is receiving batches of log records on a daily basis, the sessions are built on a daily basis, and the clustering mechanism needs to handle a batch of sessions given the current set of clusters.

The system processes a batch of sessions as follows: For each new session generated by the session builder, the system runs a loop on the already-existing clusters to find the closest cluster (i.e. the cluster that its centroid's histogram is the closest to the session's 1-gram histogram). If the distance between the session's 1-gram histogram and the closest centroid (measured as distance between the session's 1-gram histogram and the cluster's centroid histogram) is less than threshold (defined as part of the use-case configuration), the session is associated with its closest cluster. At the end of the loop, the system is left with a set of un-clustered sessions, and then it applies the global iterative clustering engine (defined above) to the un-clustered sessions (i.e. the new un-clustered sessions plus the un-clustered sessions left from the previous batch).

Activity Model Generator 46

As mentioned above system generates a set of histograms for each session. In the clustering phase only one type of histogram is being used (usually the 1-gram histograms). Thus, after the clusters have been generated, the similarity between each cluster's sessions have to be verified according to the other histograms (which represent other aspects/features of a session).

To perform this verification, the system generates for each cluster a set of histograms that will be used later to check similarity between the cluster's sessions' histograms and the cluster's histograms.

Currently the system creates the following histograms for each cluster (according to the set of histograms generated for each session):
a. A 1-gram histogram describing the distribution of the different activities during the session.
b. A 2-gram histogram describing the distribution of transitions between activities during the session.
c. A time difference histogram describing the distribution of time difference between activities during the session.

Generating these histograms is done by looping through all the sessions that belong to a cluster and adding all their histograms in order to establish the cluster's histogram.

An example of such a loop may include—looping on the users

For each user loop on the user's clusters
1. For each cluster loop on the cluster's sessions.
2. For each session loop on the session's histograms.
   a. Add session's histogram to corresponding cluster's histogram.

In the single batch mode the system reset a cluster's histogram to zero, and then perform the session's loop on all the sessions that belong to a cluster.

In multi-batch mode the system performs the session's loop only on the sessions that have been added to the cluster in current batch processing. Thus, for each session it manages a flag that indicate if the session's histograms have been added to a cluster's histograms.

Computing Average and Standard Deviations for Each Cluster

Each cluster has its own distribution of sessions around its centroid. Thus, when the method evaluates the deviation of a session from its cluster's centroid it should be evaluated according to the distribution of that cluster. This concept can be extended to each cluster's histogram, as follows: when the method compares a session's histogram to its cluster's histogram it should be done based on the cluster's distribution for this specific histogram.

Thus, the system computes for each cluster and for each histogram type the average and the standard deviation of the distance of the cluster's sessions histogram from the cluster's centroid histogram. The result is an average distance and the standard deviation of distance for each cluster's histogram that characterize the cluster's sessions distribution around the cluster's centroid for this type of histogram.

These quantities are used later (in the Sessions scoring component) to translate the distance of the session's histograms from the centroid's histograms to probabilities.

Sessions Scoring 48

The system clustered the sessions in the clustering phase according to one histogram (the 1-gram histogram), but if a session is truly characterized by the cluster, the session has to resemble to the cluster in the other features reflected by the other histograms (e.g. the 2-gram histogram). Thus, in this scoring phase the system compares the sessions to the their cluster and computes a score to the resemblance of the session to its cluster using all the histogram types.

In case the system is used to detect suspicions/malicious behavior the resemblance score is translated into a score which represent the deviation of the session from the cluster, i.e. to a score reflecting the probability of the session to be an anomaly and as result to be suspicious/malicious.

The resemblance score is computed in three steps:
a. compute a resemblance probability according to each histogram.
b. combine the histograms probabilities into a session resemblance probability.
c. compare sessions that deviate from their cluster to (all) the other clusters generated for their entity/user, to verify that the session truly deviate from the entity/user behavior profiles.

Compute a Resemblance Probability For Each Session's Histogram

For each histogram type:
a. Compute the distance between the session's histogram and the cluster's centroid's histogram.
b. Translate the distance into a distance from the cluster's average distance measured in the cluster's standard-deviation.
c. Translate the normalized distance into a probability (that the session resembles to the cluster).

d. If the probability is above a pre-configured threshold the method sets the probability to 1, meaning that from the perspective of this histogram the session resembles to the cluster.

Alternative option to compute the probability that a session resembles to its cluster is as follows:
a. use the chi-square test for the 1-gram histogram to measure if the activities during the session are distributed according to cluster's 1-gram histogram.
b. use a Markov chain to measure the resemblance of the 2-gram session's histogram to the 2-gram cluster's histogram. (The cluster's 2-gram histogram is used to build a Markov chain that is used to compute the probability of each session in the cluster.)

Combining the Histogram's Probabilities into a Session's Probability

Given the probability for each of the histograms, combine the probabilities into a session's probability. There are several ways to combine the histograms' probabilities into a session probability, and the current system implementation is to compute the "average" probability, by multiplying the probabilities of the various histograms and then raise the result to the power of 1/(number of histograms). This method can be extended to give each histogram a different weight in the "average" probability.

Compare the Session to all Clusters

At the end of the previous scoring step, the system generates a list of sessions that based on their probability deviate from the cluster the have been associated with (by the clustering engine).

Since a session may resemble to a cluster according to one feature but not according to other features, in order to accurately define a session as an anomaly the system verifies that each potential anomaly session is not similar to any of the clusters generated for its user/entity.

This verification is done by:
a. Performing a loop on all the user's cluster and computing a resemblance probability for the session and the cluster (as defined above)
b. Finding the cluster that gives the best resemblance probability.
c. Associating the session with the cluster that gives the best resemblance probability, and setting the session resemblance probability to the best resemblance probability found.

At the end of the scoring step the method has for each session a resemblance (similarity) probability.

Alert Generator 49

Computing a Risk Score for Anomaly Sessions—Alert Generator 49

For each session that according to its resemblance probability is an anomaly session, the system computes a risk score that combine the session's anomaly score (derived to the resemblance probability) with the session's sensitivity score.

The session's sensitivity score is computed by the session builder component and is based on the sensitivities of the activities that compose the session. (Note: the session's sensitivity score can take into account additional information, such as the session's time, the session's user's, etc.).

The current implementation of scores combination is a linear combination based on the weight given to the sensitivity score in the use-case configuration. (Note: more advanced combination techniques can be used to combine the anomaly score with the sensitivity score.)

White-List and Black-List Mechanism—Alert Generator 49

When an analyst is reviewing the risky sessions he/she can mark a risky session as a white-session, i.e. not suspicious/malicious and as result similar sessions in the future will be flagged a non risky sessions. The system compares all the risky sessions to the list of white sessions, and if the session resembles to one of the white sessions its risk is set to zero and alert is not generated for this session.

In a similar way the analyst can mark a risky session as a black-session, i.e. suspicious/malicious session and as a result similar sessions in the future will be flagged as risky sessions and an alert will be generated for such sessions. The system compare all the risky sessions to the list of black sessions, and if the session resembles to one of the black sessions its risk is set to the maximal risk.

In addition, an analyst can mark a cluster as a black (i.e. risky) cluster, and as a result all the current sessions assigned to the cluster as well as sessions assigned to this cluster in the future will be flagged as risky sessions.

The system may be configured to recommend on clusters as potential risky clusters according to the clusters' properties.

Alerting Component—Alert Generator 49

The alerting component review the sessions' risk scores and if a session's risk score is above a threshold (defined in the use-case configuration) an alert is generated. The alert generated includes all the relevant information regarding the session in order to enable the receiver to perform initial evaluation of the anomaly session. The alert generated can be sent to a SIEM or to any other alert's repository, via various protocols (e.g. syslog).

To tailor the alert to the organization requirement and/or to the target alerting system/protocol the use-case administrator can define a script that translates the session information to the format and protocol of the target system (that is the destination of the alerts generated, e.g. a STEM), as well as adjusting the alert's content to the target recipients. The alerting component is activating this script each time an alert should be send to the target system. Thus, the generated alert can be adjusted without any change to the alerting component.

Anomaly Visualizer and Activity Model Visualizer 47—GUI for Session Analysis and Forensics To help the CSIRT quickly analyze the suspicious sessions detected, the system provides a set of GUI analysis tools and views that enable the security analyst to understand the session's activity flow and why it was detected as anomaly and risky (the anomaly visualizer 47'). In addition, the GUI tools enables the analyst to analyze the activity profiles generated for each user (the Activity model visualizer 47).

Figure 5:
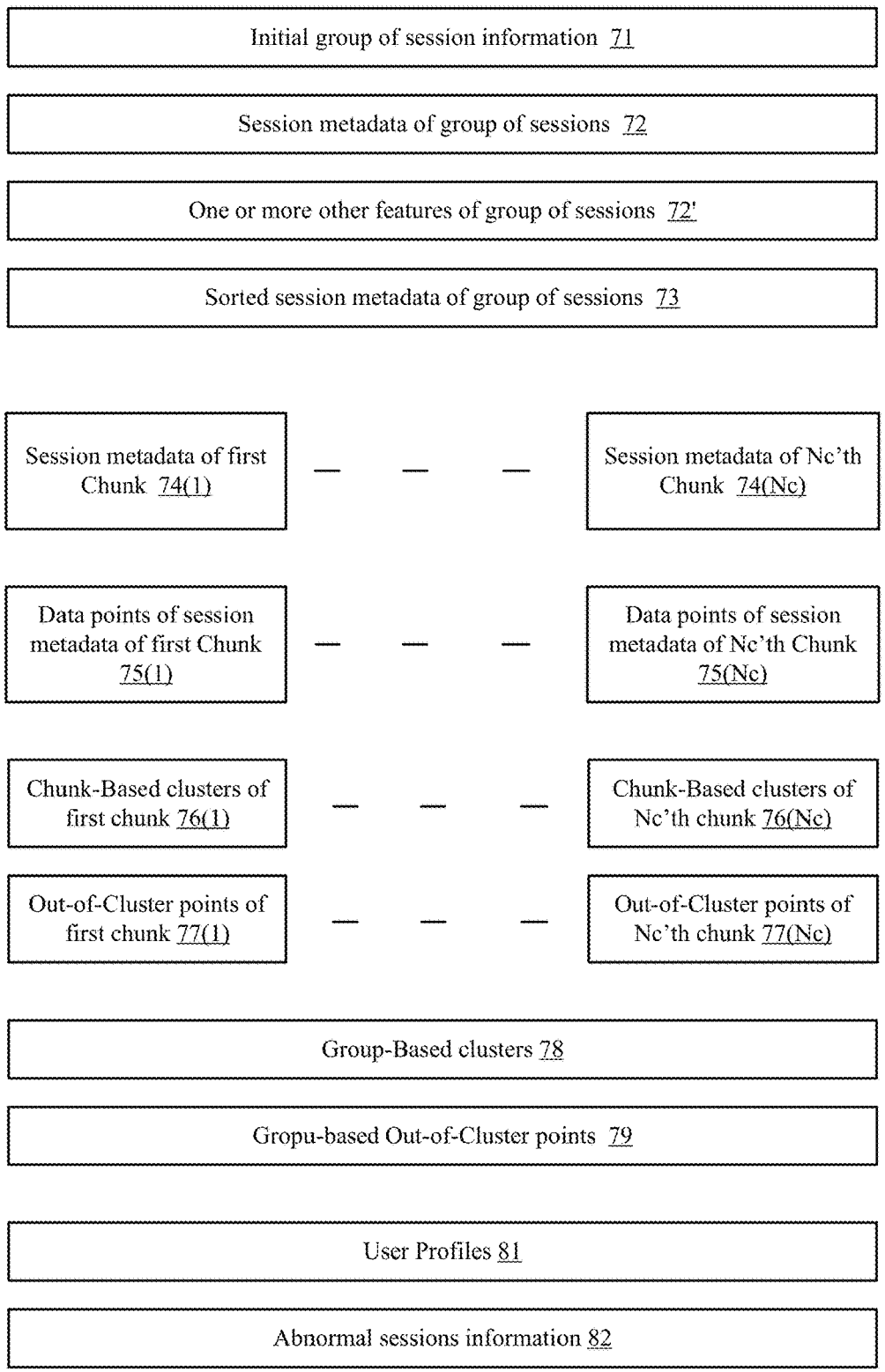
FIG. 5 illustrates various examples of data structures and/or metadata.

FIG. 5 illustrates various examples of data structures and/or metadata such as initial group of sessions information 71—it may be the information collected by the collectors, session metadata of the group of sessions 72, one or more other features of the group of sessions 72', sorted session metadata of the group of sessions 73, Nc (number of chunks) chunks—each chunk includes session metadata 74(1)-74(Nc), data points of the chunks 71( )1-75(Nc), chunk-based clusters of the Nc chunks—76(1)-76(Nc), out-of-cluster points of the Nc chunks 77(1)-77(Nc), group based clusters 78, group-based out-of-cluster points 79, user profiles 81 and abnormal sessions information 82.

There may be provided a method for cluster-analysis that may classify objects according to similarities among them, and organizing objects into groups. A cluster is a group of objects that are more similar to each other than to objects in other clusters. There are many clustering algorithms available. The most commonly used is K-Mean which generates sub-optimal clusters. Several enhancements have been suggested to address the shortcomings of K-Mean. However, the computational complexity of such enhancements is increasing rapidly as the number of objects to be clustered increase, which limits their practical usability once the number of objects to be clustered is more than several thousands. Thus, in many cases where the number of objects to be clustered is in the scale of millions, these K-Mean enhancements become totally impractical. In addition, in both the classical K-Mean as well in many of suggested enhancements to K-Mean you have to define the number of clusters to be generated, and it is highly recommend removing the outliers as they can significantly degrade the results of the K-Mean algorithm. These two requirements are impractical in many use cases, especially in cyber intrusion detection. There may be provided a global iterative clustering algorithm that can cluster any number of objects. It doesn't require to define the number of clusters to be generated or to remove outliers, and supports various similarity metrics and various normalization techniques. It can cluster objects in both single batch mode and multi-batch mode, and can update the clusters as more objects become available. The patent application also describe the system that utilize the global iterative clustering algorithm to generate entities' behavior profiles during a session (i.e. a sequence of activities performed by the entity) given a system/application log-records, and use these profiles to detects anomaly sessions that can be indicate malicious insiders and/or cyber-attacks. Another advantage of the clustering algorithm and system is their modest requirements of computational resources.

Clustering Method

There may be provided a method for clustering that can cluster millions of data points by dividing the set of data points into small chunks, and perform an accurate clustering on every chunk and then combine the clusters generated together, clean data points that are far away from their cluster's centroid as well as small clusters (the data points that are far away or belongs to small clusters are returned to pull of un-clustered data points). The method performs several iterations of this process, each time on the set of data points that are still un-clustered. The result is an efficient and accurate clustering method that can cluster millions of high dimensional data points. The process defined above eliminates the need to define up-front the number of clusters to be generated.

There may be provided a clustering method that detects anomaly data points as part of the clustering process, and eliminates the need to clean the outliers before the applying the clustering method on the data points.

There may be provided a clustering method that can cluster data points in batches and update the clusters generated as more data-points batches are processed by the clustering method.

There may be provided a clustering method that can cluster sessions according to one session feature (such as the session 1-gram histogram) and then verify the similarity according to other features, and remove sessions that doesn't resemble to the clusters generated according to the other features. At the result, each cluster contains only sessions that resemble in all the measured features.

There may be provided a generic model to describe a sequence of activities (i.e. session) by few generic features, which are the distribution of the activities, the distribution of the transitions between activities and the distribution of time difference between the activities.

There may be provided a system configured to detect anomaly sessions (consecutive sequences of activities) accurately based on the set of activities performed during the session, the order of these activities, and the time difference between the activities during the session.

There may be provided a system configured to detect anomaly sessions by comparing the session to a set of profiles (based on the session' features described above) generated for the entity who performs the session.

There may be provided a system configured to detect anomaly sessions by comparing the session to a set of profiles (based on the session' features described above) generated for the group to which the entity who performs the session belongs.

There may be provided a system configured to detect anomaly sessions by combining the anomaly score generated by comparing the session to the entity profiles with the score generated by comparing the session the group to which the entity belongs. (note: the entity is the entity which perform the activities.)

There may be provided a method for scoring a session according to its activities and other parameters (e.g. session's time, or the entity which perform the session), and to combine this score with the anomaly score to generate a session's risk score.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for searching for abnormal sessions that are indicative of a cyberattack or a malicious activity, the method comprising:
receiving or generating session metadata for each of session of the group of sessions; wherein a session metadata of a session is indicative of at least one session feature that represents activities of the session; wherein the session metadata is generated based on content of log records;
forming multiple chunks, whereas each chunk comprises session metadata regarding a portion of the group of sessions;
for each chunk, generating chunk-based clusters by applying an iterative clustering process on data points that represent session metadata of the chunk;
generating group-based clusters, based on the chunk-based clusters;
determining user profiles and the abnormal sessions, based at least on the group-based clusters and on at least one other session features, wherein the user profiles are of one or more users that participated in one or more sessions of the group of sessions; wherein the at least one other sessions features are 2-gram histograms of sessions of the group of sessions, wherein a 2-gram histogram of a session describes a distribution of transitions between activities during the session.

2. The method according to claim 1 wherein the at least one other session feature also comprises a time difference histogram describing a distribution of time difference between activities during the session.

3. The method according to claim 1 comprising responding to the user profiles and the abnormal sessions by enforcing a security rule.

4. The method according to claim 1 comprising responding to the user profiles and the abnormal sessions by visualizing information about the user profiles and the abnormal sessions.

5. The method according to claim 1 wherein session metadata of a session comprises an ordered sequence of identifiers of the activities of the session, the ordered sequence is ordered according to an occurrence of each activity within the session.

6. The method according to claim 5 wherein the forming of the chunks comprises generating a sorted list of session metadata, the sorted list is sorted according to the ordered sequences of identifiers of the sessions, and segmenting the sorted list to chunks.

7. The method according to claim 1 comprising generating a session metadata related to a session by ignoring at least one activity of the session.

8. The method according to claim 1 wherein the generating of the group-based clusters comprises at least one out of (i) merging one or more chunk-based clusters, and (ii) clustering out-of-cluster data points.

9. The method according to claim 1 wherein the applying of the iterative clustering process is executed without a preliminary step of removing suspected outliers.

10. The method according to claim 1 wherein the iterative clustering process accuracy is indifferent to an existence of outliers.

11. The method according to claim 1 wherein the iterative clustering process is executed until convergence and without predefining a final number of clusters per chunk.

12. The method according to claim 1 wherein the generating of the group-based clusters is executed without predefining a final number of group-based clusters.

13. The method according to claim 1 wherein the applying an iterative clustering process comprises finding out-of-cluster data points and wherein the generating of the group-based clusters comprises attempting to cluster the out-of-cluster data points.

14. The method according to claim 1 wherein the step of generating the group-based clusters comprises performing multiple iterations of (a) calculating clusters and out-of-cluster points, and (b) attempting to cluster the out-of-cluster data points.

15. The method according to claim 1 wherein the applying an iterative clustering process comprises performing multiple clustering iterations, each clustering iteration comprises applying an enhanced K-means clustering algorithm.

16. The method according to claim 14 wherein a first clustering iteration comprises (i) selecting a first centroid based on normalized distances between a data points of a chunk, and (ii) applying the k-means clustering on the data points of the chunk, given the first centroid.

17. The method according to claim 15 wherein each clustering iteration of the multiple clustering iteration comprises (i) selecting a new centroid, based on (a) a normalized distance of data points from other data points, and (b) distances of the data points from current centroids, and (ii) applying the k-means clustering on the data points of the chunk, given the new centroid and the current centroids.

18. The method according to claim 1 wherein the applying of the iterative clustering process and the generating of the group-based clusters comprises enforcing a minimal size of cluster.

19. The method according to claim 1 comprising evaluating a risk associated with an abnormal session.

20. The method according to claim 19 wherein the evaluating of the risk is based, at least in part, on a deviation of the abnormal session from a user profile.

21. The method according to claim 19 wherein the evaluating of the risk is based, at least in part, on a sensitivity related to one or more activities of the abnormal session.

22. The method according to claim 1 wherein the sessions are software as service (SaaS) application sessions.

23. The method according to claim 1 wherein the group of sessions are related to a single user.

24. The method according to claim 1 wherein the group of sessions are related to multiple user.

25. A non-transitory computer readable for searching for abnormal sessions that are indicative of a cyberattack or a malicious activitythe non-transitory computer readable medium stores instructions for:

receiving or generating session metadata for each of session of a group of sessions; wherein a session metadata of a session is indicative of at least one session feature that represents activities of the session; wherein the session metadata is generated based on content of log records;

forming multiple chunks, whereas each chunk comprises session metadata regarding a portion of the group of sessions;

for each chunk, generating chunk-based clusters by applying an iterative clustering process on data points that represent session metadata of the chunk;

generating group-based clusters, based on the chunk-based clusters;

determining user profiles and the abnormal sessions, based at least on the group-based clusters and on at least one other session features; wherein the user profiles are of one or more users that participated in one or more sessions of the group of sessions; wherein the at least one other sessions features are 2-gram histograms of sessions of the group of sessions, wherein a 2-gram histogram of a session describes a distribution of transitions between activities during the session.

26. A computerized system for searching for abnormal sessions that are indicative of a cyberattack or a malicious activity, the computerized system comprises a memory unit and a processor that is configured to:

receive or generate session metadata for each of session of a group of sessions;

wherein a session metadata of a session is indicative of at least one session feature that represents activities of the session;

form multiple chunks, whereas each chunk comprises session metadata regarding a portion of the group of sessions; wherein the session metadata is generated based on content of log records;

for each chunk, generate chunk-based clusters by applying an iterative clustering process on data points that represent session metadata of the chunk;

generate group-based clusters, based on the chunk-based clusters; and determine user profiles and the abnormal sessions, based at least on the group-based clusters and on at least one other session features, user profiles and the abnormal sessions, wherein the user profiles are of one or more users that participated in one or more sessions of the group of sessions; wherein the at least one other sessions features are 2-gram histograms of sessions of the group of sessions, wherein a 2-gram histogram of a session describes a distribution of transitions between activities during the session.

* * * * *